United States Patent [19]

Miller et al.

[11] Patent Number: 5,434,719
[45] Date of Patent: Jul. 18, 1995

[54] CORRECTION OF HEADER INFORMATION IN A MAGNETIC DISC DRIVE

[75] Inventors: Jeffrey A. Miller, Santa Cruz; Mark H. Groo, Scotts Valley; Prafulla B. Reddy, Santa Cruz; Stanley M. Schekall, Sunnyvale, all of Calif.

[73] Assignee: Seagate Technology, Inc., Scotts Valley, Calif.

[21] Appl. No.: 215,122

[22] Filed: Mar. 18, 1994

[51] Int. Cl.⁶ ............................................. G11B 5/09
[52] U.S. Cl. ............................................ 360/53; 360/48
[58] Field of Search ...................... 360/53, 48, 46, 32; 371/21.6, 37.2, 40.1

[56] References Cited

U.S. PATENT DOCUMENTS

| Re. 34,088 | 10/1992 | Tsang et al. | 371/37.8 |
|---|---|---|---|
| 4,030,067 | 6/1977 | Howell et al. | 340/146.1 |
| 4,151,510 | 4/1979 | Howell et al. | 340/146.1 |
| 4,236,247 | 11/1980 | Sundberg | 371/38 |
| 4,360,916 | 11/1982 | Kustedjo et al. | 371/37 |
| 4,397,022 | 8/1983 | Weng et al. | 371/37 |
| 4,473,902 | 9/1984 | Chen | 371/37 |
| 4,564,941 | 1/1986 | Woolley et al. | 372/2 |
| 4,567,594 | 1/1986 | Deodhar | 371/38 |
| 4,599,722 | 7/1986 | Mortimer | 371/37 |
| 4,623,999 | 11/1986 | Patterson | 371/37 |
| 4,633,471 | 12/1986 | Perera et al. | 371/38 |
| 4,763,332 | 8/1988 | Glover | 371/37 |
| 4,777,635 | 10/1988 | Glover | 371/40 |
| 4,835,759 | 5/1989 | Saito et al. | 360/39 |
| 4,890,287 | 12/1989 | Johnson et al. | 371/37.2 |
| 4,961,193 | 10/1990 | Debord et al. | 371/37.2 |
| 5,243,604 | 9/1993 | Tsang et al. | 371/40.1 |
| 5,268,908 | 12/1993 | Glover et al. | 371/37.1 |
| 5,270,877 | 12/1993 | Fukushima et al. | 360/48 |
| 5,280,488 | 1/1994 | Glover et al. | 371/37.1 |

FOREIGN PATENT DOCUMENTS

0240921 10/1987 European Pat. Off. .

*Primary Examiner*—Aristotelis Psitos
*Assistant Examiner*—Won Tae C. Kim
*Attorney, Agent, or Firm*—Westman, Champlin & Kelly

[57] ABSTRACT

An apparatus for correcting header information includes a transducer for reading and writing encoded information to a magnetic storage medium. A serial-/deserializer provides a deserialized output. Header information from the deserializer is stored in a header storage register. The deserialized header information is also provided to a header error correction circuit. The header error correction circuit provides an output indicating location and value of errors in the header memory. This information is used to correct errors in the header memory. The corrected header information is compared with predetermined header information and used to determine whether subsequent data associated with the header should be written to or read from the magnetic storage medium.

18 Claims, 5 Drawing Sheets

Fig. 1

| 0 | 1 | 2 | 3 | 4 | 5 | 6 | 7 | 8 | 9 | A | B | C | D | E |
|---|---|---|---|---|---|---|---|---|---|---|---|---|---|---|
| f2/f3/ | lba5 | lba4 | lba3 | lba2 | lba1 | f1 | sd1/ | sd2/ | sd3/ | sd4/ | sd5/ | sd6/ | sd7/ | sd8/ |
| f4 | f2/f3 | /f2 | | | | | md1 | md2 | md3 | md4 | md5 | md6 | md7 | md8 |

*Fig. 2*

| HEADER DATA BYTES | X PAD | PARITY SYMBOLS | Y PAD |
|---|---|---|---|

| DATA (BYTES) | DATA (BITS) | X PAD (BITS) | Y PAD (BITS) | DATA SYMBOLS (SYMBOLS) | TOTAL SYMBOLS (SYMBOLS) | TOTAL CODEBITS (BITS) | HEADER (BYTES) |
|---|---|---|---|---|---|---|---|
| 5  | 40  | 0 | 0 | 8  | 16 | 80  | 10 |
| 6  | 48  | 2 | 6 | 10 | 18 | 90  | 12 |
| 7  | 56  | 4 | 4 | 12 | 20 | 100 | 13 |
| 8  | 64  | 6 | 2 | 14 | 22 | 110 | 14 |
| 9  | 72  | 8 | 0 | 16 | 24 | 120 | 15 |
| 10 | 80  | 0 | 0 | 16 | 24 | 120 | 15 |
| 11 | 88  | 2 | 6 | 18 | 26 | 130 | 17 |
| 12 | 96  | 4 | 4 | 20 | 28 | 140 | 18 |
| 13 | 104 | 6 | 2 | 22 | 30 | 150 | 19 |
| 14 | 112 | 8 | 0 | 24 | 32 | 160 | 20 |
| 15 | 120 | 0 | 0 | 24 | 32 | 160 | 20 |

CORRECTION OF HEADER INFORMATION IN A MAGNETIC DISC DRIVE

BACKGROUND OF THE INVENTION

The present invention relates to magnetic disc drives. More particularly, the present invention relates to correction of errors in header information in a magnetic disc drive.

Magnetic recording devices are used to magnetically store information. Typically, the entire magnetic storage medium is not used to record the user "data." A portion of the information carried on the medium is called a "header" and carries information related to the data, which (on most formats) follows the header. The header includes an LBA (logical block address) which is an address used to identify, i.e ID, the location of the data. The header also contains flags and skip descriptors for microdefect or servoburst skips (typically two bytes per skip descriptor).

The prior art has been directed to detection rather than correction of header errors. Upon detection, the disc controller must abort the data read and wait for the header data to come around a second time for a retry. This is time consuming and negatively impacts system performance.

The time period incurred between the reading of a header and the following data field as the disc spins translates into a physical gap. This gap is wasted space on the storage medium. The more processing that the disc controller must do during this period, the longer the period and the gap. Typical error correction techniques for the data field are complex and time consuming, requiring many "byte times" to process the information which can be on the order of a full sector read-back time; even for "on-the-fly" techniques. Thus, typical error correction techniques are not appropriate because of the time required to correct the error(s) before comparison between the corrected header LBA and target or searched LBA can be made, allowing for the decision of whether the subsequent associated data field should be read or written. Even a small delay will cause a significant reduction in disc storage capabilities because each header on the disc will require a longer gap preceding the data field.

Techniques are known for correcting errors occurring in the data field. For example, U.S. R. No. RE34,088 reissued Oct. 6, 1992 entitled ON THE FLY ERROR CORRECTION shows an apparatus for correcting errors in data fields. However, these techniques are not appropriate for header information due to the aforementioned gap.

SUMMARY OF THE INVENTION

Header information is read back from a magnetic storage medium. A serializer/deserializer (SER/DES) deserializes the readback information. Deserialized header information is provided to a header buffer and to a header error correction circuit. The header error correction circuit provides an output indicating which locations in the header buffer contain errors. Based upon this information, the header information stored in the header buffer is corrected. Following the correction, the controller uses LBA, flag and correction status information to decide whether to write or readback the data field associated with the header. One aspect of the invention includes writing header information with appended error correction data.

DETAILED DESCRIPTION OF THE PREFERRED EMBODIMENTS

Figure 1:
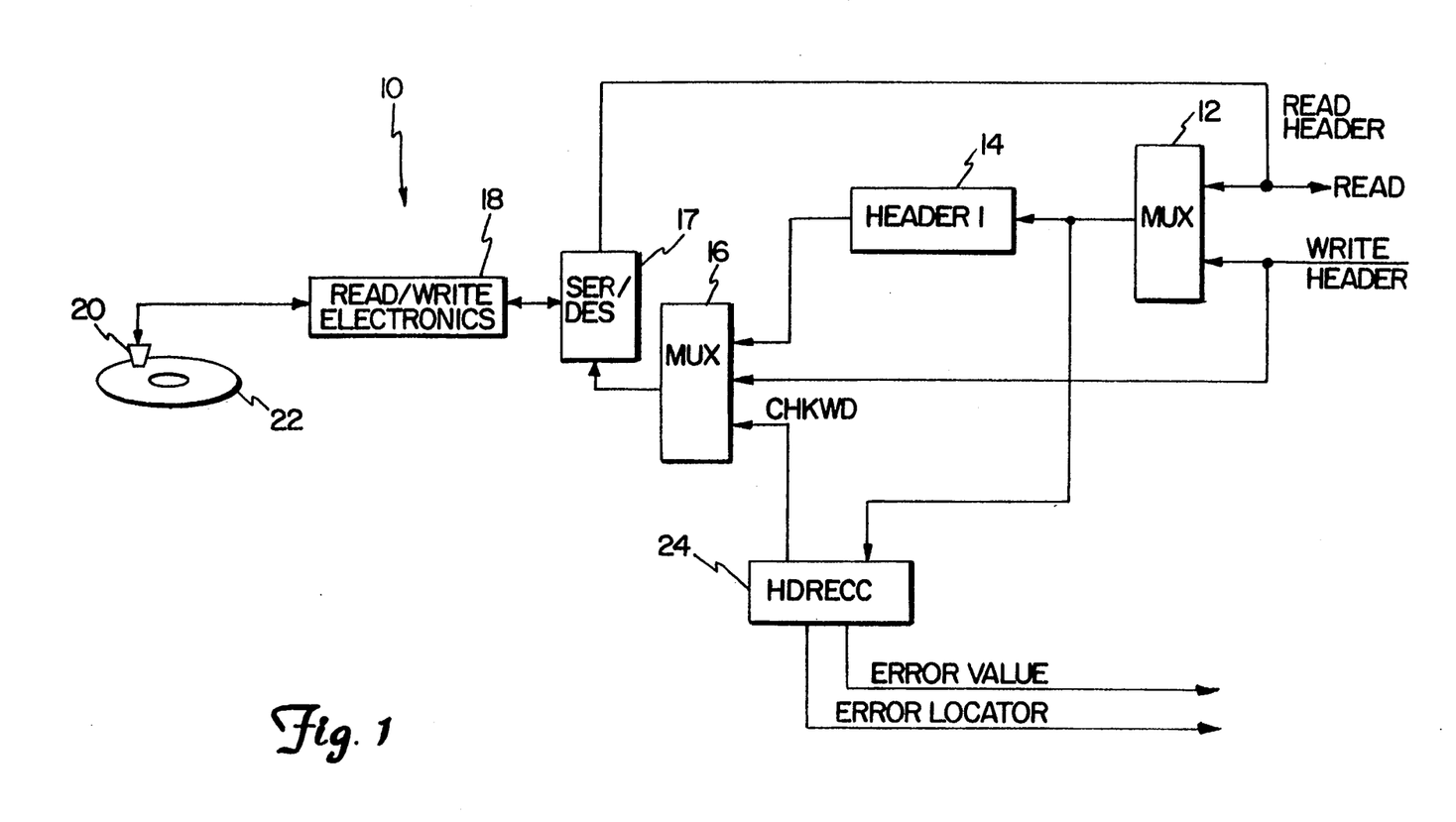
FIG. 1 is a block diagram of a header error correction system in accordance with the present invention.

FIG. 1 is a block diagram of system 10. System 10 includes multiplexer 12, header storage register 14, multiplexer 16, serializer/deserializer (SER/DES) 17, read/write electronics 18, read/write head 20, disc 22, and header error correction circuitry (HDRECC) 24. System 10 is used to read and write header information in accordance with the error correction system of the invention.

Write header information is provided from a source, for example, an external buffer (not shown) through multiplexer 12 to header register 14 and HDRECC 24. Write header information is also provided to multiplexer 16. HDRECC 24 divides the write header information, symbol by symbol, by a generator polynomial. When head 20 is appropriately located over disc 22 to perform a write operation, header information is clocked out of register 14 in a first-in-first-out (FIFO) manner, through multiplexer 16 to SER/DES 17 and read/write electronics 18. Read/write electronics 18, in turn, provide the information to head 20 which writes the header to disc 22.

At the end of every header, which comprises a predetermined number of symbols, the remainder from mathematical division of the symbols by a generator polynomial is clocked out of HDRECC 24 through multiplexer 16 to SER/DES 17 and read/write electronics 18. This remainder is appended to the header and inserted into the sequential write header information to be recorded on disc 22. The remainder comprises, in one embodiment, five redundancy bytes of eight symbols of five bits each.

Essentially, the reverse procedure is used during reading of header information from disc 22. Read/write electronics 18 reads back header information from disc 22. SER/DES 17 deserializes the information and provides the header information to multiplexer 12 and an output labeled Read. RAM 14 receives the header information from multiplexer 12. HDRECC divides the codeword symbols, including the appended checkwords, by the generator polynomial. The output of HDRECC 24 provides the error value and the error locator.

Prior art techniques for providing error correction have been inappropriate for application to correction of header information. Header information tends to be relatively small in size in comparison to data information readback from a storage disc. A typical header may be 15 bytes of data. Data information occupies the vast majority of the storage space on a magnetic disc. Simply due to its size, the majority of errors occur during readback of data information. As error correction techniques have improved, the ability to operate in higher raw error environments has increased. This has caused the errors that occur during readback of header information to become a significant factor in overall readback errors. However, an error correction technique of suitable performance has not been achieved for application to header information. Thus, the present invention provides header error correction in a magnetic disc drive. One aspect of the invention is directed to the following goals:

1. Correction of one error event up to a predetermined number of bits in length via appropriate selection of interleave depth and symbol size per header with a zero probability of miscorrection.
2. Detection of up to three error events of up to a predetermined number of bits in length per header with a zero probability of an undetected error or miscorrection.
3. Minimize probability of undetected erroneous header information.
4. Minimize header redundancy check bit overhead.
5. Minimize correction delay. This provides a minimal gap between header and data fields due to the correction delay. Further, correction status is available one byte time after the last error correction check symbol has been read.
6. Capability to work in conjunction with and support up to four microdefect or servo burst skips.
7. Support for multiple data fields per header operation.
8. Support of more than one flag byte.
9. Support for ID (LBA) comparison of up to five bytes out of a total of 15 bytes of header information. This does not include redundancy check bits.

Applicants have discovered that a Reed-Solomon ECC decoder is well suited for achieving the above goals.

In one embodiment, the selected code provides:

1. Reed-Solomon Code over $GF(2^5)$ defined by primitive polynomial $p(x)=x^5+x^2+1$. (5-bit symbol oriented code).
2. Encoded to $t=2$, $d_{min}=5$ level using generator polynomial $G(x)=(x+a^0)(x+a^1)(x+a^2)(x+a^3)$, which can also be written as $G(x)=x^4+a^{23}x^3+a^{17}x^2+a^{26}x+a^6$.
3. Interleaved to depth $i=2$.
4. Decoding algorithm selected for $e_c=1$ symbol/interleave guaranteed on-the-fly error correction, and $e_d=3$ symbols/interleave guaranteed error detection.
5. Requires addition of four 5-bit check symbols/interleave (i.e., 20 bits/interleave$\times 2$ interleaves/header=40 check bits) 40 parity bits=5 Parity bytes (P1–P5) per header.
6. In theory, a maximum of 33 bytes of header data could be protected by the 5 parity bytes.

| Code Parameter Summary: | |
| --- | --- |
| symbol size | m = 5 bits/symbol |
| encoded level | t = 2 symbols/codeword |
| interleave depth | i = 2 codewords/header frame |
| # of corrections | $c_c$ = 1 symbol/interleave |
| # of detections | $c_d$ = 3 symbols/interleave |
| correction span | b = 6 bits guaranteed |

Capabilities (Probabilities): Probability of miscorrection in an interleave when guaranteed capabilities are exceeded and single symbol correction is performed=$P_{mc}=3.56\times 10^{-4}$.

| BER | $P_{ue}$ | $P_{ed}$ | $P_{ued}$ |
| --- | --- | --- | --- |
| $1.0 \times 10^{-8}$ | $2.75 \times 10^{-15}$ | $5.16 \times 10^{-29}$ | $1.8 \times 10^{-32}$ |
| $1.0 \times 10^{-7}$ | $2.75 \times 10^{-13}$ | $5.16 \times 10^{-25}$ | $1.8 \times 10^{-28}$ |
| $1.0 \times 10^{-6}$ | $2.75 \times 10^{-11}$ | $5.16 \times 10^{-21}$ | $1.8 \times 10^{-24}$ |
| $1.0 \times 10^{-5}$ | $2.75 \times 10^{-9}$ | $5.15 \times 10^{-17}$ | $1.8 \times 10^{-20}$ |
| $1.0 \times 10^{-4}$ | $2.74 \times 10^{-7}$ | $5.14 \times 10^{-13}$ | $1.8 \times 10^{-16}$ |
| $1.0 \times 10^{-3}$ | $2.66 \times 10^{-5}$ | $4.99 \times 10^{-9}$ | $1.6 \times 10^{-12}$ |
| $1.0 \times 10^{-2}$ | $1.97 \times 10^{-3}$ | $3.73 \times 10^{-5}$ | $1.3 \times 10^{-8}$ |

(calculations are based on 15 byte headers, i.e., 10 bytes data + 5 bytes ECC redundancy)

Definitions:

BER=raw bit error rate in error events/bit $P_{ue}$=probability of uncorrectable header error (probability of exceeding one erroneous symbol per interleave)

$P_{ed}$=Probability of exceeding guaranteed detection (probability of exceeding three erroneous symbols per interleave)

$P_{ued}$=probability of undetected erroneous sector write or read due to header decode failure.

Figure 2:
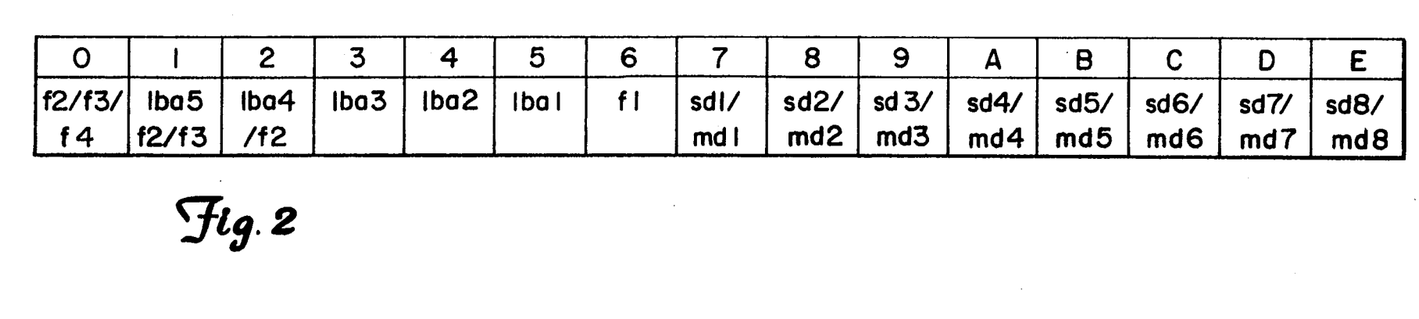
FIG. 2 shows the arrangement of bytes in a header field in accordance with the present invention.

FIG. 2 shows the arrangement of information in a header field in one embodiment of the present invention. The typical arrangement of header information bytes has been altered in order to provide a contiguous data block for the Reed-Solomon error correction system of the invention. It has been discovered that the rearrangement of data of information in the header field provides improved efficiency. The unusual arrangement of information shown in FIG. 2 supports the following:

One or more flag bytes.

Three to five LBA ID bytes (locations 1–5).

From zero to four skip descriptors for microdefect or servoburst skips, (typically two bytes per skip md and sd). These are shown in locations 7 through E sd1 through sd8/md1 through md8.

Figure 3:
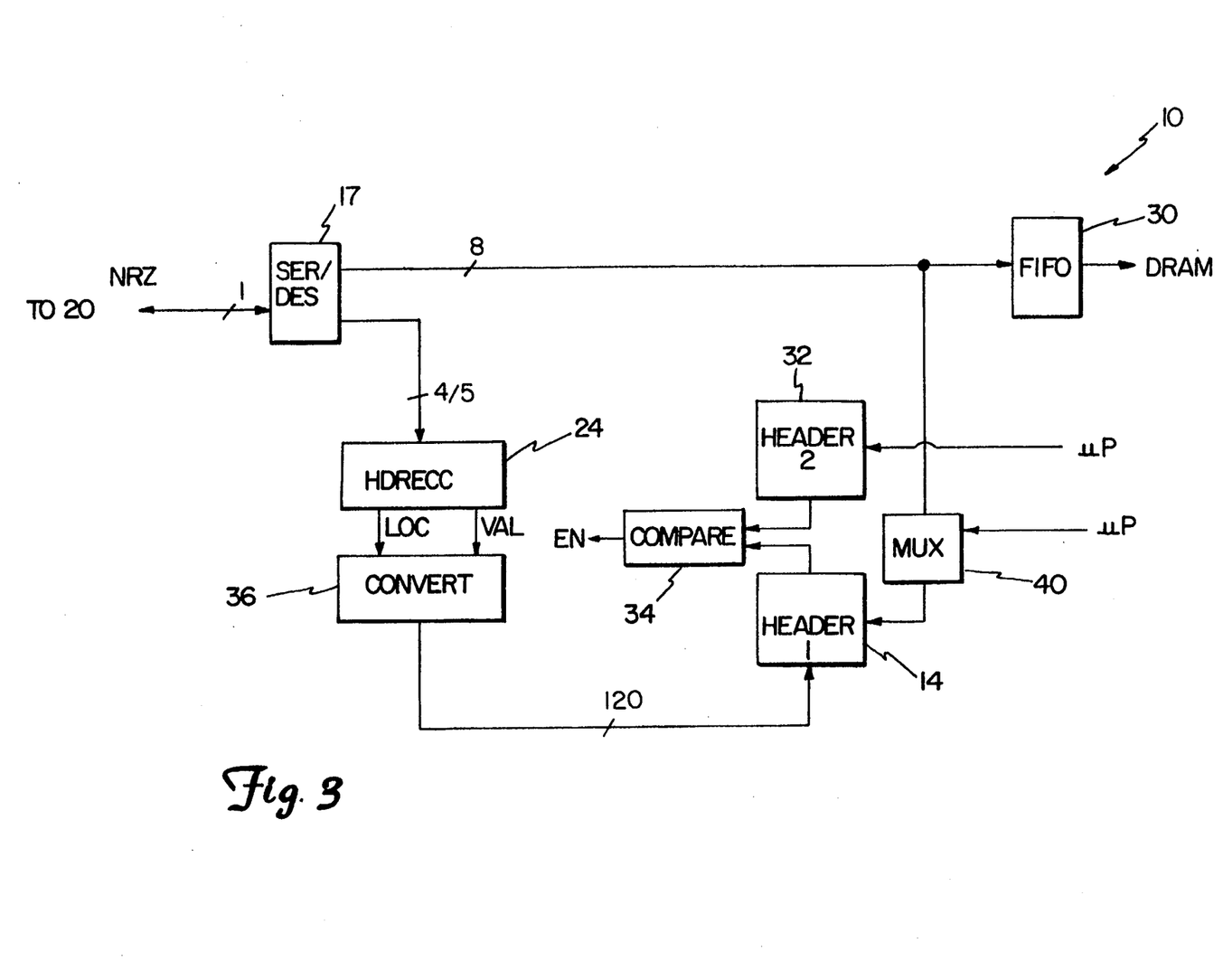
FIG. 3 shows a more detailed block diagram of circuitry of the invention.

FIG. 3 shows a more detailed block diagram of header error correction circuitry in accordance with the present invention. FIG. 3 shows circuitry of FIG. 1 during a readback operation. For simplicity, the multiplexers and various paths used during a write operation are not shown.

FIG. 3 shows system 10 including serial deserializer (SER/DES) 17, header register1 14, and HDRECC circuit 24. FIG. 3 also shows FIFO 30, header register2 32, compare circuit 34 and convert circuit 36.

In operation, SER/DES 17 receives NRZ coded data from disc 22 through head 20 and read/write electronics 18. SER/DES 17 provides two outputs. One output from SER/DES 17 is 8 bits wide and is connected to FIFO buffer 30. The other output from SER/DES 17 is either 4 or 5 bits wide (depending on the embodiment of the of the invention) and provided to HDRECC circuit 24. HDRECC circuit 24 has two outputs and error value output and an error locator output which are provided to convert circuit 36. In one embodiment, convert circuit 36 provides an output to header register1 14 which is 120 bits wide. Generally, convert circuit 36 provides an output to header register1 14 comprising buffer address mask information. Note that the connection between HDRECC 24 and convert circuitry 36 is not shown in FIG. 1.

System 10 shown in FIG. 3 includes header register2 32 coupled to a microprocessor (not shown) which is part of the disc controller. Header register2 32 and header register1 14 are coupled to compare circuit 34. Compare circuit 34 compares the contents of register1 14 and register2 32 and provides an enable output when the contents of the two registers match. It should be noted that the header shown in FIG. 2 shows byte locations which correspond to byte locations in header register1 14. Header register 2 contains target LBA and byte counter values.

In operation, header information is routed to HDRECC 24 and header register1 14 from SER/DES 17. Normal data is provided to FIFO 30.

In one preferred embodiment, header information is encoded using a Reed-Solomon code having five bits per symbol (m). Further, the encoded level (t) is two symbols per codeword and the interleave depth (i) is two codewords per header. However, these are selected based upon the characteristics of the data channel. HDRECC 24 is a Reed-Solomon encoder/decoder for the above specified m, t, and i. HDRECC 24 provides error location and value information to convert circuit 36. Convert circuit 36 translates the codeword value and location information into header register1 14 buffer address mask information. During header readback, the header information is simultaneously routed through the 8 bit wide path of SER/DES 17 to MUX 40. MUX 40 places header bits into header register1 14 under the control of the microprocessor (not shown). As stated above, the format of header information in header register1 14, is that shown in FIG. 2. Following calculation of the error correction information from HDRECC 24 and convert circuit 36, the mask information is applied to header register1 14. This step causes bits in header register1 14 which are in error to be flipped to the opposite state. This results in a corrected header residing in header register1 14.

During a readback operation, the microprocessor (not shown) puts the desired or target header information, including LBA ID information and flag data, into header register2 32. Following error correction of readback header information and header register1 14, the appropriate contents of the two registers 14 and 32 are compared through a flash comparison by compare circuit 34 which takes a single computation. If the flash comparison indicates that the LBA information and flag information is a match, compare circuit 34 provides an enable output to the controller. This enable output instructs the controller that a match has occurred and that subsequent information readback from the storage medium should be accepted as the sought after information.

Note that typical arrangement of the header data bytes is not well suited for high speed error correction. They do not provide the flexibility needed to easily support different numbers of LBA bytes, flag bytes and skip descriptors. Typical prior art techniques for decoding and identifying header information process individual bytes as they are output by the SER/DES. This allows for information first received during readback to be processed and acted upon before the complete header information is retrieved.

The present invention overcomes deficiencies in the prior art by loading the entire header into a register which is subsequently subject to any necessary correction. Following any correction, the header information is compared with desired header information in a single, flash comparison. This provides a significant speed increase.

Contiguous data organization in the header store provides much greater efficiency and reduced overhead than information which is not contiguous. Further, this provides much simplified and reduced hardware requirements, particularly in the translation of codeword location to header address location. If this is the case, application of the corrected header information is much slower because the corrected information must be passed through a multiplexer and placed into the order to match the header information. Note that the format of the header information shown in FIG. 2 is such that it will always provide a contiguous set of bytes in the header store (buffer). Specifically, the data is centered about flag 1 shown in location 6. As LBA data information is added, the header expands in a direction to the left. Finally, additional flag bytes may be added at the left most locations. Similarly, as servoburst/microdefect information is added to the header, it expands to the right of the flag 1 byte. This new format is highly advantageous in that when the header information in header register1 14 is compared with the header information in header register2 32, comparator circuit 34 can perform a flush byte per byte comparison centered around flag 1. Flag 1 always occupies the same location in header register1 14 (and header register2 32). If the LBA information matches and the various flag bits also match, readback of data is enabled by compare circuit 34. Thus, this unique technique has significant advantages over the prior art.

In a preferred embodiment, bytes 1 through 5 (the LBA bytes) shown in FIG. 2 are hard-wired, bit-by-bit to a 40-bit ID comparator. If fewer bytes are required, then the compare function is masked on the unused bytes and the second flag byte, if used, is moved into the location adjacent the highest used LBA byte. The 12 least significant bytes of bytes 7 and 8, 9 and A, B and C, and D and E, (two bytes skip descriptors) are ORed to a byte count comparator which is used to trigger servoburst or microdefect skipping. The most significant bit of bytes 7, 9, B and D are used to describe the nature of the associated skip descriptor, i.e. whether a servoburst skip or microdefect skip is intended. This method allows for as many or as few of the skip descriptors to be used interchangeably as servoburst or microdefect descriptors with no multiplexing required. The architecture is directly expandable to cover as many skip descriptors as required, for example, up to the 33 byte header information limit which is imposed by the depth two interleave (i), five bit symbol oriented error correction.

Figure 4:
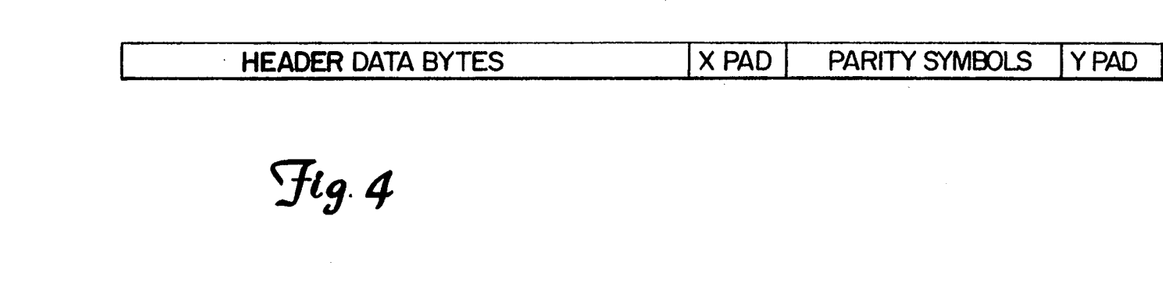
FIG. 4 shows a header field format with padding.
Figure 5:
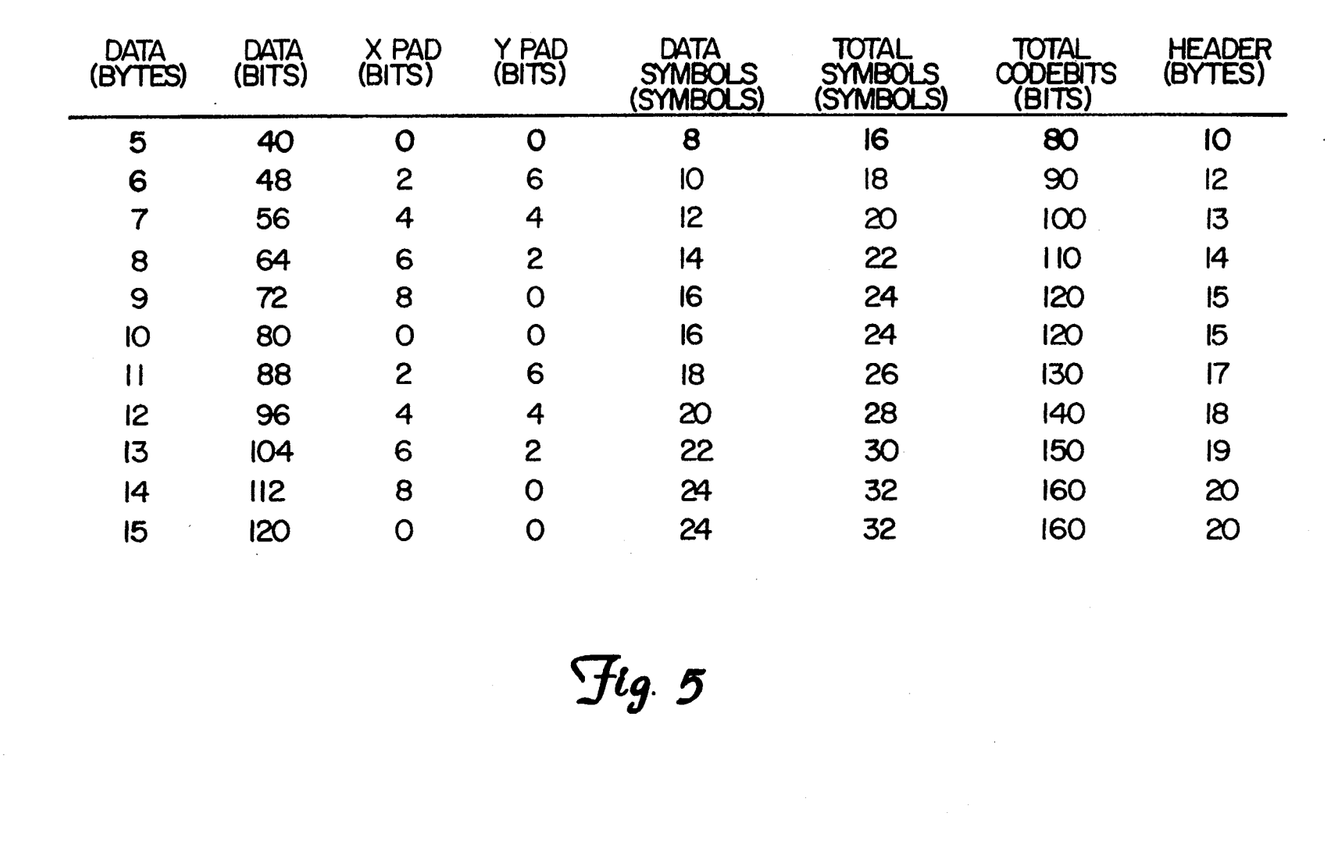
FIG. 5 is a table showing the impact of the padding of FIG. 4.

FIG. 4 shows a header field format with padding in accordance with the invention. As shown in FIG. 4, header data bytes are followed by an x-pad, then parity symbols, and then a y-pad. This leads to the table shown in FIG. 5. Padding may be required in conjunction with the symbols (5-bit) of the Header ECC in order to maintain format byte (8-bit) boundaries as supported by the disc formatter.

If the number of data bytes in the header field is not a multiple of 5, then an x-pad and y-pad totalling 8-bits will be required.

The x-pad is applied in order to make the total number of data bits+x-pad bits be a multiple of two 5-bit symbols. This insures that two equal length codewords will be produced, simplifying the hardware mapping of codeword symbol error locations to buffer address locations.

The y-pad is applied in cases where the total of data bits+x-pad bits+parity bits is not an integer number of bytes. In these cases, the y-pad bits are added in order to make the total number of header bits exactly divisible by 8, and thus an integer number of bytes, as required by the disc formatter.

Figure 6:
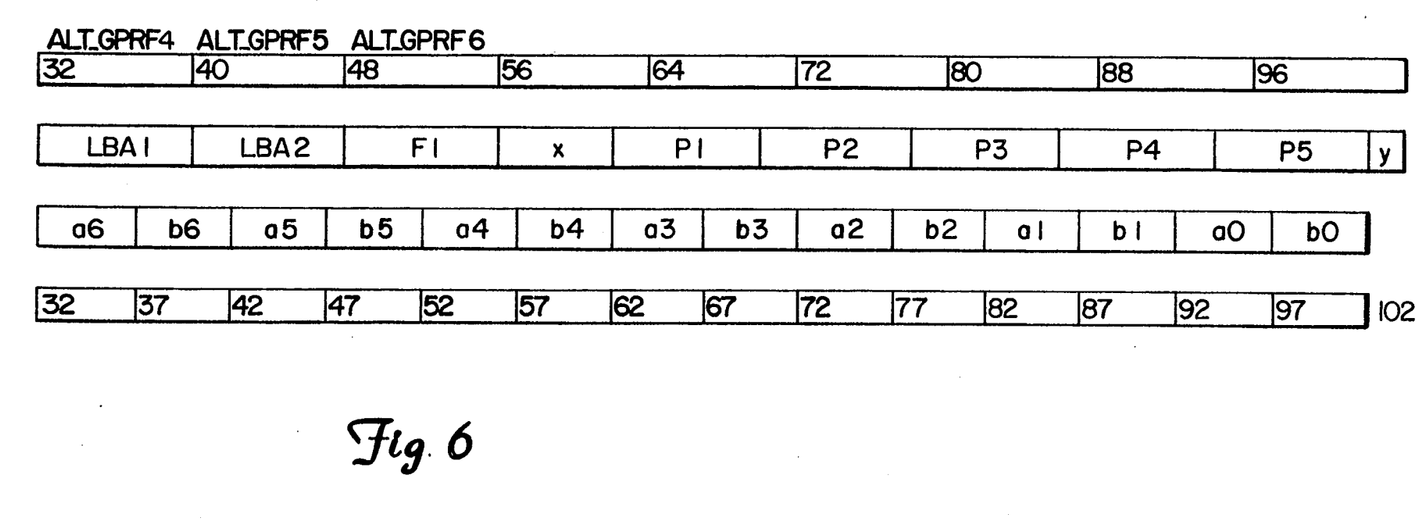
FIG. 6 shows boundaries between header information in a header field in accordance with the invention.

FIG. 6 shows a detailed example of a header format having two LBA bytes and one flag byte. FIG. 6 shows the boundaries due to the five bit symbols requirement between adjacent bytes in the header.

The following is an example of another embodiment of the invention using four bit symbol.

The code's parameters are:

Reed-Solomon Code over GF ($2^4$) (4-bit symbol, i.e. nibble, oriented code)
Encoded to t=2
Interleaved to depth i=4
Decoding algorithm selected for $e_c=1$ symbol/interleave guaranteed on-the-fly error correction, and $e_d=3$ symbols/interleave guaranteed error detection
Requires addition of eight parity check bytes per header (each interleave requires four symbols of redundancy; 4 nibbles×4 interleaves=8 bytes)

Code parameters summary:

| | |
|---|---|
| symbol size | m = 4 bits/symbol |
| encoded level | t = 2 symbols/codeword |
| interleave depth | i = 4 codewords/header frame |
| number of corrections | $C_c$ = 1 symbol/interleave |
| number of detections | $C_d$ = 3 symbols/interleave |
| correction span | b = 2 bytes or 13 bits guaranteed |

Header ECC capabilities (probabilities):

The probability of miscorrection in a given interleave when guaranteed detection capabilities are exceeded and single symbol correction is performed—$P_{mc}=2.08\times 10^{-3}$

| BER | $P_{ue}$ | $P_{ed}$ | $P_{ued}$ |
|---|---|---|---|
| $1.0 \times 10^{-8}$ | $1.6 \times 10^{-15}$ | $8.9 \times 10^{-30}$ | $1.9 \times 10^{-32}$ |
| $1.0 \times 10^{-7}$ | $2.6 \times 10^{-13}$ | $8.9 \times 10^{-26}$ | $1.9 \times 10^{-28}$ |
| $1.0 \times 10^{-6}$ | $2.6 \times 10^{-11}$ | $8.9 \times 10^{-22}$ | $1.9 \times 10^{-24}$ |
| $1.0 \times 10^{-5}$ | $1.6 \times 10^{-9}$ | $8.9 \times 10^{-18}$ | $1.9 \times 10^{-20}$ |
| $1.0 \times 10^{-4}$ | $1.6 \times 10^{-7}$ | $8.9 \times 10^{-14}$ | $1.9 \times 10^{-16}$ |
| $1.0 \times 10^{-3}$ | $1.6 \times 10^{-5}$ | $8.7 \times 10^{-10}$ | $1.8 \times 10^{-12}$ |
| $1.0 \times 10^{-2}$ | $1.3 \times 10^{-3}$ | $7.7 \times 10^{-6}$ | $1.6 \times 10^{-8}$ |

(calculations are based on 18 byte headers, i.e., 10 bytes data + 8 bytes ECC redundancy)

Once error values and locations are identified, the location and value information are translated into mask information which operates on the header store in a read-modify-write operation.

The present invention can be further optimized in situations where certain bits in the header are not used. For example, in some situations certain bits within the flag bytes and skip descriptors are not used, even though they are contained in the header. Or, in situations where certain bits are used and their value is known, the hardware can be optimized. For example, if certain flag byte bit locations are not used, they can be forced to a value of zero (or any known value) during a write operation. During readback, the appropriate bit locations can be forced to zero (or whatever the known value is) prior to the step of correcting errors (by shifting the bits through the syndrome calculation). This forced correction is done in the HDRECC block 24 shown in the figures. This technique gives guaranteed 100% error correction of the known bits. Note that this provides an improvement to overall error correction. This is because errors which occur in the known bit locations and are corrected by this mechanism do not contribute to error events that would exceed the guaranteed capabilities of the correction system.

Although the present invention has been described with reference to preferred embodiments, workers skilled in the art will recognize that changes may be made in form and detail without departing from the spirit and scope of the invention. For example, different length symbols (m), encoding level (t), and interleave depth (i) can be used. Further, the techniques of the invention apply to error correction methods other than the Reed-Solomon technique described in the preferred embodiment. One aspect of the invention includes applying Reed-Solomon codes having codeword symbols of less than eight bits in length to header error correction in order to reduce hardware requirements and provide high speed operation.

What is claimed is:

1. An apparatus for reading back header information in a magnetic storage system comprising:

a transducer for reading information from a magnetic storage medium and providing a serial output;

a serializer/deserializer for converting the serial output into a parallel format;

header storage means for storing header information received from the serializer/deserializer;

header error correction circuitry for receiving header information and error correction information from the serializer/deserializer and providing an output related to locations of errors in the header information stored in the header storage means; means for correcting the header information stored in the header storage means based upon the output from the header error correction circuitry; and means for comparing corrected header information in the header storage means with predetermined header information and actuating data readback from the magnetic storage medium in response to the comparison.

2. The apparatus of claim 1 wherein the header information includes a flag and wherein a flag has a fixed location in the header storage means.

3. The apparatus of claim 2 wherein LBA information in the header storage means resides in a continuous block on a single side of the flag location.

4. The apparatus of claim 2 wherein skip descriptor information in the header storage means resides in a continuous block on a single side of the flag location.

5. The apparatus of claim 1 wherein the header information read back from the magnetic storage medium is interleaved with respect to separate codewords.

6. The apparatus of claim 1 wherein the header error correction circuitry comprises a Reed-Solomon Error Correction Circuitry Decoder.

7. The apparatus of claim 6 wherein the Reed-Solomon Decoder uses a four-bit symbol oriented interleaved code.

8. The apparatus of claim 1 wherein values of certain bits in the header are of a known value and the header error correction circuitry forces these bits to their known value.

9. An apparatus for correcting header information read from a magnetic storage medium, comprising:

means for reading header information from the magnetic storage medium;

a header storage register coupled to the means for reading header information, the header storage register containing a contiguous header;

error correction circuitry for identifying locations of errors in the contiguous header contained in the header storage register;

means for correcting errors in the contiguous header contained in the header storage register based upon an output from the error correction circuitry; and means for comparing corrected header information in the header storage register with predetermined header information and actuating data readback from the magnetic storage medium in response to the comparison.

10. The apparatus of claim 9 wherein the header information includes a flag and wherein a flag has a fixed location in the header storage register.

11. The apparatus of claim 10 wherein LBA information in the header storage register resides on a single side of the flag location.

12. The apparatus of claim 11 wherein LBA information in the header storage register resides on a single side of the flag location.

13. The apparatus of claim 9 wherein the header information read back from the magnetic storage medium is interleaved with respect to separate codewords.

14. The apparatus of claim 13 wherein the Reed-Solomon Decoder uses a four-bit symbol oriented code.

15. The apparatus of claim 9 wherein the header error correction circuitry comprises a Reed-Solomon Error Correction Circuitry Decoder.

16. An apparatus for reading and writing header information in a magnetic storage system comprising:

a transducer for reading and writing information to a magnetic storage medium and providing a serial output;

a serializer/deserializer for converting the serial output into a parallel format during readback and providing information to the transducer during writing;

means for appending check symbols to header information written by the transducer, the check symbols used to correct errors in header information during readback;

header storage means for storing header information received from the serializer/deserializer;

header error correction circuitry for receiving header information and error correction information from the serializer/deserializer and providing an output related to locations of errors in the header information stored in the header storage means;

means for correcting the header information stored in the header storage means based upon the output from the header error correction circuitry; and means for comparing corrected header information in the header storage means with predetermined header information and actuating data readback from the magnetic storage medium in response to the comparison.

17. The apparatus of claim 16 wherein the header information includes a flag and wherein a flag has a fixed location in the header storage means, 18. The apparatus of claim 17 wherein LBA information in the header storage means resides on a first side of the flag location and skip descriptor information in the header storage means resides on a second side of the flag location.

* * * * *